July 8, 1941.    C. T. MULVANY    2,248,183
APPARATUS FOR ASSEMBLING NUTS AND BOLTS
Filed Sept. 13, 1940    2 Sheets-Sheet 1

Inventor
Clyde T. Mulvany,
By B. B. Collings
Attorney

July 8, 1941.  C. T. MULVANY  2,248,183
APPARATUS FOR ASSEMBLING NUTS AND BOLTS
Filed Sept. 13, 1940  2 Sheets-Sheet 2
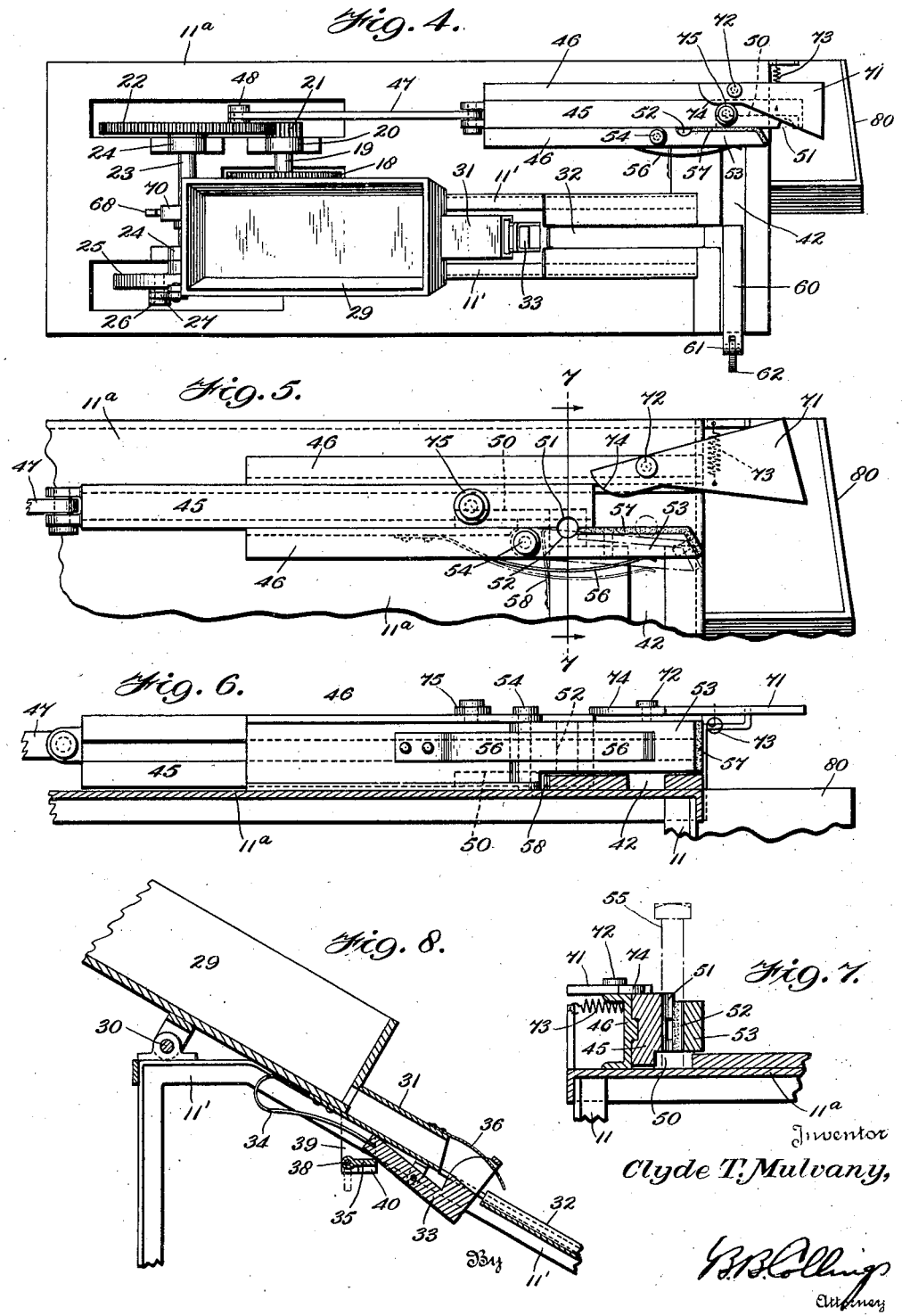
Inventor
Clyde T. Mulvany, Patented July 8, 1941

2,248,183

UNITED STATES PATENT OFFICE 2,248,183

APPARATUS FOR ASSEMBLING NUTS AND BOLTS

Clyde T. Mulvany, Los Gatos, Calif.

Application September 13, 1940, Serial No. 356,714

14 Claims. (Cl. 10—155)

The invention relates to a machine for assembling nuts and bolts, and has for its principal object the provision of an apparatus of this character which will be simple in construction, comparatively inexpensive to manufacture and operate, and more efficient in use than those which have been heretofore proposed.

With the above and other objects in view, which will appear as the description proceeds, the invention consists essentially in a reciprocating slide member, preferably although not necessarily power driven, which slide is recessed for the reception of a nut and is further provided with a substantially semi-cylindrical groove communicating with the recess, said groove in one position of the slide being adapted to register with a complemental groove formed in a pivoted spring-pressed rotation imparting member to form a cylindrical aperture for the reception and guidance of the threaded end of a bolt to a nut in the recess. As the slide is moved from this position it carries the bolt with it, the spring-pressed member yielding for this purpose and the engagement between a friction surface provided thereon and the surface of the bolt producing rotation of the latter, which in conjunction with the prevention of rotation of the nut by the walls of the recess, causes the bolt to be threaded into the nut. Means are also preferably provided for positively disengaging the bolt from the slide groove as it reaches the end of the friction surface of the rotation-imparting member, whereby the bolt with the nut threaded thereon will be deposited into a suitable chute or receptacle.

The invention also includes and has for a further object the provision of means for automatically feeding the nuts to the slide recess in timed relation to the movements of the slide. The bolts are or may be fed manually by the operator. This portion of the invention comprises a guideway terminating in juxtaposition to the slide recess, said guideway including an inclined portion which may be disposed at an angle to said terminal portion, which inclined portion receives the nuts, one at a time, from a supply hopper which is oscillatably mounted and arranged to be automatically rocked back and forth in timed relation to the movements of the other operating elements of the machine. The said hopper is provided with a gate for controlling the discharge of the nuts therefrom to the guideway; and an automatically operating feeding member is provided for positively moving the nuts along the terminal portion of the guideway and into the slide recess.

Referring to the accompanying drawings forming a part of this specification, in which like reference characters designate like parts in all the views—

Fig. 4 is a top plan view of the parts shown in Fig. 1;

Fig. 5 is an enlarged fragmentary plan view of the slide member and its associated elements, the parts being illustrated in the positions they occupy at the time of receiving a bolt for assembly with a nut already positioned in the slide recess;

Fig. 6 is an elevational view of the parts shown in Fig. 5;

Fig. 7 is a transverse sectional view, taken approximately on the plane indicated by the line 7—7 of Fig. 5; and Fig. 8 is an enlarged fragmentary longitudinal sectional view, illustrating the supply hopper in position to feed a nut to the inclined portion of the guideway.

Figure 1:
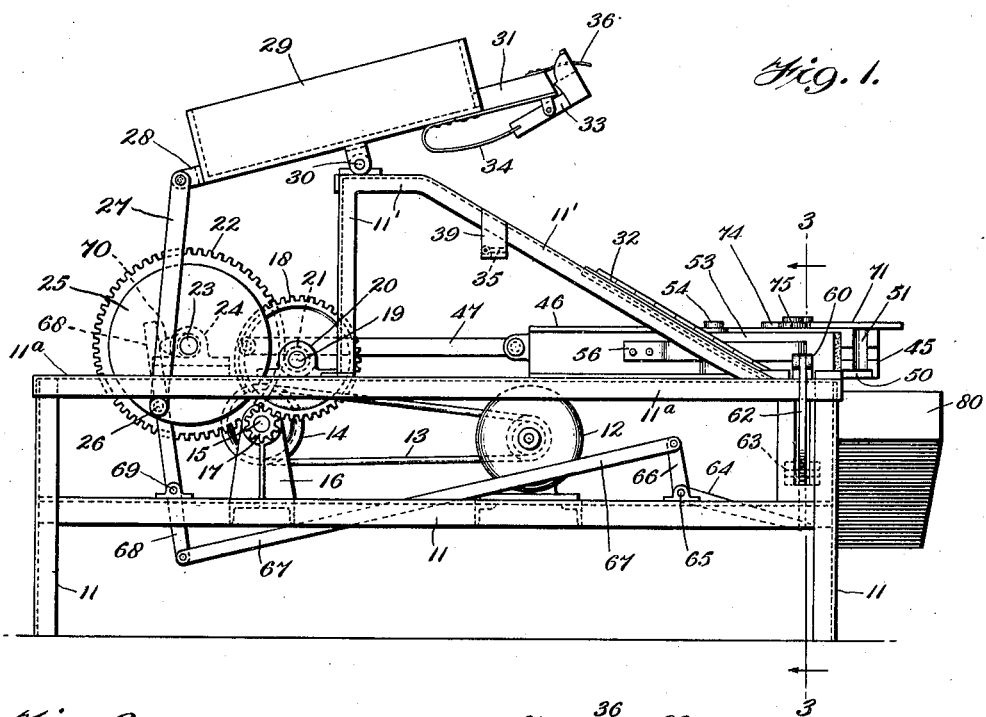
Figure 1 is a side elevational view of one form of apparatus constructed and arranged in accordance with the invention, the parts being illustrated in the positions they occupy at the time an assembled bolt and nut have just been discharged.

In the said drawings the machine is illustrated as comprising a supporting framework 11 upon which may be mounted an electric motor 12 which by means of a belt 13 drives a pulley 14 carried by a countershaft 15 journaled in suitable bearings 16. The said shaft 15 carries a pinion 17 meshing with a gear 18 carried by a jackshaft 19 journaled in bearings 20. The jackshaft 19 carries a pinion 21 meshing with a gear 22 carried by the main shaft 23 journaled in bearings 24. The shaft 23 carries at one end a disk 25 having a crank pin 26 which is connected by a link 27 to a bracket 28 carried by a supply hopper 29 for the nuts. The said hopper is pivotally mounted as at 30 upon the frame members 11' and is adapted to be oscillated, by the connections just described, between the positions shown in Figures 1 and 8 to discharge nuts through the tubular extension or throat 31 to an inclined chute or guideway 32 also carried by the frame members 11'.

The said discharge extension 31 is provided with a pivoted gate member 33 which is normally maintained in the position shown in Figure 1 by a spring 34 which gate member however, as the hopper is moved to discharging position, will engage with a stop member 35 as shown in Figure 8 to be swung to a position in which it will permit the nuts to be discharged into the chute or guideway 32 as will be readily understood from said Figure 8. A spring 36 is preferably associated with the tubular discharge member 31 and the gate member 33 to guide the nuts during the transfer between the members 31 and 32 and prevent them from jumping out of the chute. The stop member 35 is pivoted as at 38 between a pair of ears 39 depending from the frame members 11', which ears are provided with inturned lugs 40 upon which the stop member 35 normally rests. If for any reason it is desired to stop the feed of the nuts from the hopper 29, the stop member 35 may be swung in a counter-clockwise direction to the broken line position shown in Figure 8, whereupon it will fail to engage the gate member 33 as the hopper reaches the Figure 8 position and the gate will not be tripped to discharge a nut.

Figure 2:
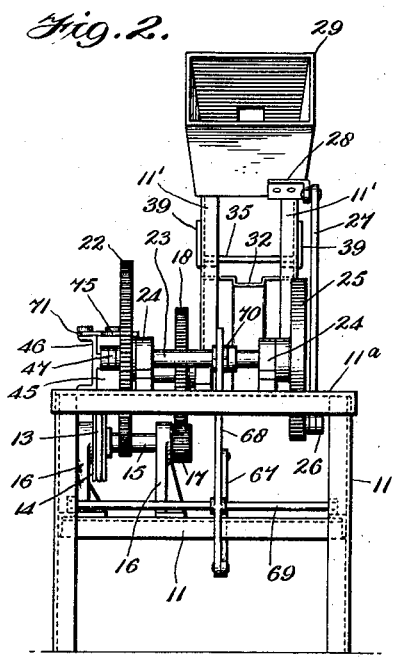
Fig. 2 is an end elevational view of the parts shown in Fig. 1, as seen from the left of the latter figure.

As will be readily understood from Figs. 1 and 2 the inclined chute or guideway 32 extends longitudinally of the machine, and at substantially the point where it reaches the platform 11ᵃ of the framework it communicates with a transverse channel or guideway 42 through which the nuts are fed to the assembling members.

These members comprise a slide 45 mounted for reciprocation in suitable guides 46 and movable therein by means of a pitman 47 which is connected to a crank end 48 carried by the gear 22. The under portion of the outer end of the slide 45 is provided with a recess 50 for receiving nuts from the channel or guideway 42 and the said slide is also provided with a vertical groove 51 substantially semi-cylindrical in shape and communicating with the said recess 50. When the slide 45 is retracted to the position shown in Figs. 5 and 6, this groove 51 registers with a complemental groove 52 formed in the member 53 which is pivoted as at 54 to one of the guides 46 for swinging movements in a horizontal plane. When the two grooves 51 and 52 are thus in register they form a cylindrical aperture for the reception of the threaded end of the bolt 55 (see Fig. 7) which bolt is introduced manually into the said aperture by the operator and guided by the aperture to the nut which has been received in the recess 50 and retracted by the slide to a position in which its threaded opening alines with the aperture formed by the grooves 51 and 52, as shown in Fig. 5.

The member 53 is normally urged toward the position shown in Fig. 5 by a spring 56, and its inner surface is preferably provided with friction material 57 of rubber, leather, or other suitable composition. A spring 58 extends beneath the member 53 to assist in positioning the nut accurately with relation to the bolt-receiving aperture.

Figure 3:
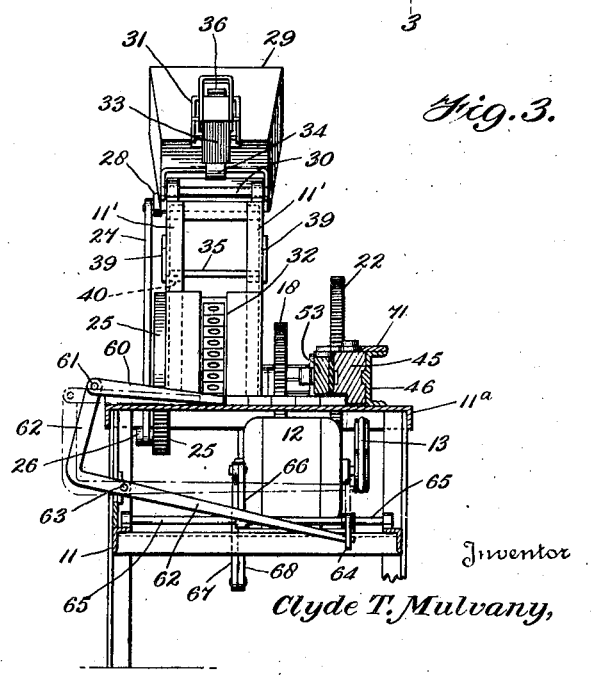
Fig. 3 is a transverse sectional elevational view, taken approximately on the plane indicated by the line 3—3 of Fig. 1, looking in the direction of the arrows.

The inclination of the portion 32 of the guideway is such that the nuts will preferably move down it by gravity, but the portion 42 of the guideway is horizontal and it is necessary to provide means for positively moving the nuts therethrough to the assembling mechanism. As here shown, these means comprise the finger 60 pivoted as at 61 to an L-shaped lever 62 which is pivoted as at 63 to the framework 11. Said lever 62 is connected to an arm 64 which is rigidly carried by a rock shaft 65 which also carries an arm 66 which is connected by a link 67 to the lower end of the lever 68 pivoted as at 69 on the framework, the upper end of which co-acts with a cam 70 carried by the main shaft 23. The parts are so timed that the feeding finger 60 will be moved to the position shown in Figs. 3 and 4 as the slide 45 assumes the position shown in the latter figure, so that a nut from the channel or guideway 42 will be moved into the recess 50 of the slide just before the latter begins its return movement to the bolt receiving position illustrated in Figure 5.

The operation of the machine will be clear from the foregoing, it being understood that when the operator introduces a bolt into the alined grooves 51 and 52 to bring its lower threaded end into engagement with the threaded aperture in the nut the slide 45 then moves toward the right from the position shown in Figure 5, and by reason of the engagement of the friction material 57 with the surface of the bolt rotation is imparted to the latter as it is carried along the member 53, the latter yielding as indicated in broken lines in Fig. 5, whereby the threads of the bolt will be caused to engage with the threads of the nut and the two assembled together sufficiently to enable them to be handled thereafter as a unit. As the slide approaches the position shown in Fig. 4 the bolt will leave the friction material 57 and in most instances will drop by the action of gravity from the groove 51 into a chute or receptacle 80 provided at the right hand end of the machine. However, in order to insure the discharge of the coupled nut and bolt from the slide, a dog 71 is pivoted as at 72 upon one of the guides 46, said dog being normally retracted to the position shown in Fig. 5 by a spring 73. The inner end of the dog is provided with a curved camming surface 74 which is engageable by a roller or projection 75 carried by the slide 45 as the latter approaches the Fig. 4 position thereof. This engagement of the roller or projection 75 with the curved surface of the dog will cause the latter to be swung from the Fig. 5 to the Fig. 4 position thereof, and in so moving the outer end of the dog will move at least partially across the groove 51 and effectively dislodge any bolt which may not drop therefrom by gravity.

While one form of the invention has been illustrated and described it is obvious that those skilled in the art may vary the details of construction as well as the precise arrangement of parts without departing from the spirit of the invention and therefore it is not wished to be limited to the above disclosure except as may be required by the claims.

What is claimed is:

1. In a machine for assembling nuts and bolts, the combination of a slide having a recess for receiving and holding a nut against rotation, and a groove communicating with said recess; a member adjacent said slide provided with a complemental groove which in one position of the slide registers with the slide groove to form an aperture for receiving and guiding a bolt to a nut positioned in said recess, said member also having a surface engageable by the bolt to impart rotation to the latter whereby it may be threaded into the nut; and means for moving the slide to cause the bolt to traverse said surface.

2. The combination stated in claim 1, wherein the bolt-engaging surface of the rotation-imparting member is provided with a facing of friction material.

3. The combination stated in claim 1, wherein the rotation-imparting member is yieldably mounted for transverse movement relative to the bolt.

4. The combination stated in claim 1, wherein the rotation-imparting member is pivotally mounted for transverse movement relative to the bolt and is pressed into engagement therewith by a spring.

5. In a machine for assembling nuts and bolts, the combination of a slide having a recess for receiving and holding a nut against rotation, said slide also having a groove communicating with said recess; a member adjacent the slide provided with a complemental groove which in one position of the slide registers with the slide groove to form an aperture for receiving and guiding a bolt to a nut positioned in said recess, said member also having a surface engageable by the bolt to impart rotation to the latter, whereby it may be threaded into the nut; means for moving the slide to cause the bolt to traverse said surface; and means for discharging the assembled bolt and nut from the slide.

6. In a machine for assembling nuts and bolts, the combination of a slide having a recess for receiving and holding a nut against rotation, said slide also having a groove communicating with said recess; a member adjacent the slide provided with a complemental groove which in one position of the slide registers with the slide groove to form an aperture for receiving and guiding a bolt to a nut positioned in said recess, said member also having a surface engageable by the bolt to impart rotation to the latter whereby it may be threaded into the nut; means for moving the slide to cause the bolt to traverse said surface; and means actuated by the slide for positively discharging the assembled bolt and nut from the slide groove as the bolt leaves the rotation-imparting surface.

7. In a machine for assembling nuts and bolts, the combination of a slide having a recess for receiving and holding a nut against rotation, said slide also having a groove communicating with said recess; a member adjacent the slide provided with a complemental groove which in one position of the slide registers with the slide groove to form an aperture for receiving and guiding a bolt to a nut positioned in said recess, said member also having a surface engageable by the bolt to impart rotation to the latter whereby it may be threaded into the nut; means for moving the slide to cause the bolt to traverse said surface; and means comprising a pivoted dog for positively discharging the assembled bolt and nut from the slide groove as the bolt leaves the rotation-imparting surface.

8. In a machine for assembling nuts and bolts, the combination of a slide having a recess for receiving and holding a nut against rotation, said slide also having a groove communicating with said recess; a member adjacent the slide provided with a complemental groove which in one position of the slide registers with the slide groove to form an aperture for receiving and guiding a bolt to a nut positioned in said recess, said member also having a surface engageable by the bolt to impart rotation to the latter whereby it may be threaded into the nut; means for moving the slide to cause the bolt to traverse said surface; a dog pivoted for movement transversely of said slide groove whereby it may engage and discharge a bolt from said groove; and a projection on said slide engageable with said dog as the bolt leaves the rotation-imparting surface to cause the dog to strike the bolt and discharge it from the slide groove.

9. In a machine for assembling nuts and bolts, the combination of a slide having a recess for receiving and holding a nut against rotation, and a groove communicating with said recess; a member adjacent said slide provided with a complemental groove which in one position of the slide registers with the slide groove to form an aperture for receiving and guiding a bolt to a nut positioned in said recess, said member also having a surface engageable by the bolt to impart rotation to the latter whereby it may be threaded into the nut; means for moving the slide to cause the bolt to traverse said surface; and means for auomatically feeding nuts to said recess in timed relation to the movements of said slide.

10. The combination stated in claim 9, wherein the means for feeding the nuts to the recess include a guideway for the nuts and a reciprocating finger for moving them along said guideway to the recess.

11. The combination stated in claim 9, wherein the means for feeding the nuts to the slide recess include a guideway for the nuts; a reciprocating finger for moving them along a portion of said guideway, to the recess; and a movable hopper for intermittently feeding the nuts to said guideway.

12. The combination stated in claim 9, wherein the means for feeding the nuts to the slide recess include a guideway for the nuts; a reciprocating finger for moving them along a portion of said guideway to the recess; and a movable hopper for intermittently feeding the nuts to said guideway, said hopper having a discharge throat and a gate for controlling the discharge of nuts therefrom.

13. The combination stated in claim 9, wherein the means for feeding the nuts to the slide recess comprise a guideway for the nuts having a horizontal portion leading to said recess and an angularly disposed inclined portion communicating with said horizontal portion; a reciprocating finger for moving the nuts intermittently along said horizontal portion to said recess; and a pivoted hopper for intermittently feeding the nuts to said inclined portion.

14. The combination stated in claim 9, wherein the means for feeding the nuts to the slide recess comprise a guideway for the nuts having a horizontal portion leading to said recess and an angularly disposed inclined portion communicating with said horizontal portion; a reciprocating finger for moving the nuts intermittently along said horizontal portion to said recess; a pivoted hopper for intermittently feeding the nuts to said inclined portion, said hopper having a discharge throat and a spring pressed pivoted gate for controlling the discharge of nuts therefrom; and a stop member engageable by said gate to cause it to release nuts to the inclined portion of said guideway, said stop member being movable to an inoperative position to prevent actuation of the gate when it is desired to cut off the feed of nuts to the guideway.

CLYDE T. MULVANY.